(12) United States Patent
Fukuoka

(10) Patent No.: US 8,615,560 B2
(45) Date of Patent: Dec. 24, 2013

(54) DOCUMENT DATA SHARING SYSTEM AND USER APPARATUS

(75) Inventor: Fumihiro Fukuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/175,691

(22) Filed: Jul. 1, 2011

(65) Prior Publication Data

US 2012/0023180 A1    Jan. 26, 2012

(30) Foreign Application Priority Data

Jul. 26, 2010 (JP) ................................. 2010-167476

(51) Int. Cl.
*G06F 15/16* (2006.01)

(52) U.S. Cl.
USPC .......................................... 709/206; 709/219

(58) Field of Classification Search
USPC .................................................. 709/206, 219
See application file for complete search history.

(56) References Cited

U.S. PATENT DOCUMENTS

| | | | |
|---|---|---|---|
| 7,831,676 B1* | 11/2010 | Nagar | 709/206 |
| 2005/0283461 A1* | 12/2005 | Sell et al. | 707/1 |
| 2006/0095527 A1* | 5/2006 | Malik | 709/206 |
| 2009/0319618 A1* | 12/2009 | Affronti et al. | 709/206 |
| 2011/0066955 A1* | 3/2011 | Olson et al. | 715/752 |
| 2011/0078257 A1* | 3/2011 | Touve | 709/206 |
| 2011/0153857 A1* | 6/2011 | Dumitru et al. | 709/231 |
| 2011/0218973 A1* | 9/2011 | Pendlebury et al. | 707/692 |
| 2011/0276897 A1* | 11/2011 | Crevier et al. | 715/752 |
| 2012/0265817 A1* | 10/2012 | Vidalenc et al. | 709/204 |

FOREIGN PATENT DOCUMENTS

JP    2006-330899    12/2006    ............. G06F 13/00

* cited by examiner

*Primary Examiner* — Firmin Backer
*Assistant Examiner* — Jonathan Bui
(74) *Attorney, Agent, or Firm* — Fitzpatrick, Cella, Harper & Scinto

(57) ABSTRACT

The present invention provides a document data sharing system including a user apparatus that transmits and receives e-mail and a server apparatus that hierarchizes and registers different versions of document data and provides the document data to the user apparatus, wherein the user apparatus includes a transmitting unit that, when registering document data attached to a received e-mail in the server apparatus, generates a list of identification information of one or more past e-mails related to the e-mail and transmitting a registration request including the list to the server apparatus, and the server apparatus includes a registration unit that determines a version of document data to be registered indicated by the registration request based on the identification information in the list included in the registration request received from the user apparatus and registers the document data in a corresponding hierarchical position.

12 Claims, 16 Drawing Sheets

FIG. 4

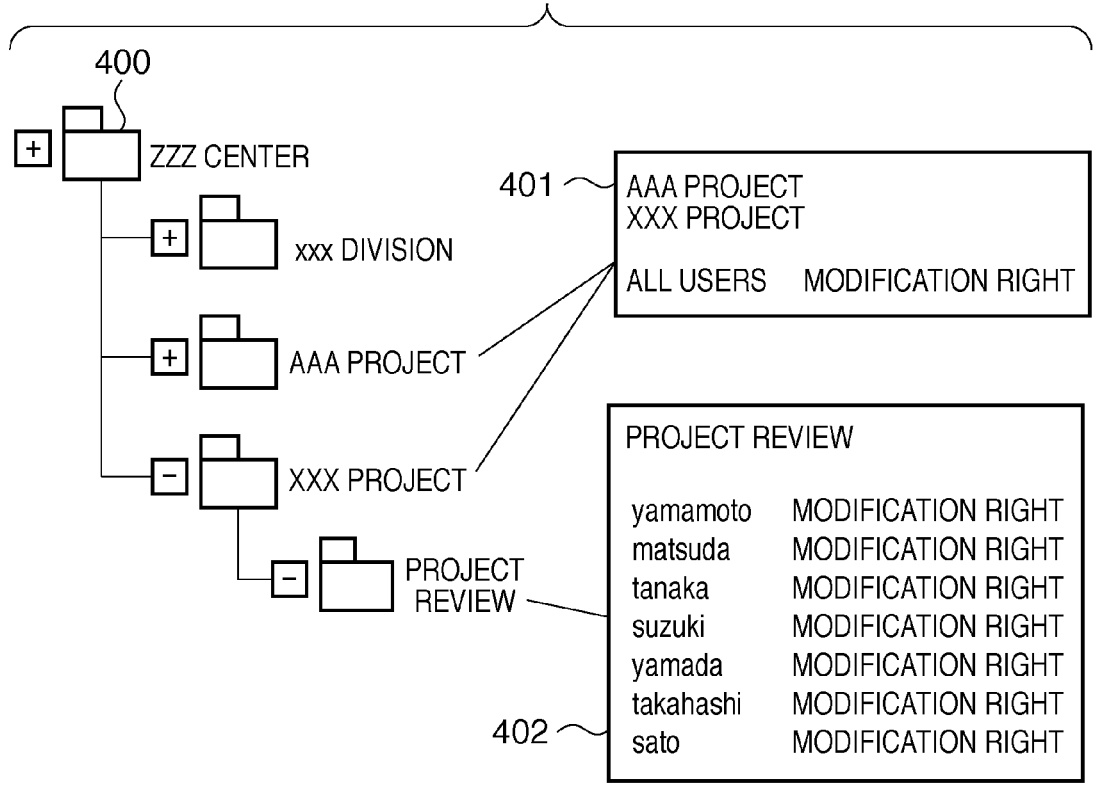

FIG. 5

| USER ID | USER NAME | LOG-IN ID | E-MAIL ADDRESS |
|---|---|---|---|
| 0001023 | Yamamoto Takashi | yamamoto | yamamoto.takashi@xxx.co.jp |
| 0001030 | Matsuda Takeshi | matsuda | matsuda.takeshi@xxx.co.jp |
| 0001035 | Tanaka Kenji | tanaka | tanaka.kenji@xxx.co.jp |
| 0001041 | Suzuki Hanako | suzuki | suzuki.hanako@xxx.co.jp |
| 0001050 | Yamada Taro | yamada | yamada.taro@xxx.co.jp |
| 0001055 | Takahashi Susumu | takahashi | takahashi.susumu@xxx.co.jp |
| 0001072 | Sato Yoshio | sato | sato.yoshio@xxx.co.jp |

FIG. 6A

| SENDER | TRANSMITTED DATE AND TIME | SUBJECT | ATTACHED FILE |
|---|---|---|---|
| sato.yoshio@xxx.co.jp | 2009/09/01 09:05:15 | PROJECT REVIEW MATERIAL | PROJECT REVIEW MATERIAL-20090901.ppt |
| suzuki.hanako@xxx.co.jp | 2009/09/01 15:20:08 | ├ Re:PROJECT REVIEW MATERIAL | PROJECT REVIEW MATERIAL-20090901-2.ppt |
| sato.yoshio@xxx.co.jp | 2009/09/01 16:28:45 | └ Re:PROJECT REVIEW MATERIAL | PROJECT REVIEW MATERIAL-20090901-3.ppt |
| takahashi.susumu@xxx.co.jp | 2009/09/02 09:01:10 | └ Re:PROJECT REVIEW MATERIAL | |
| yamada.taro@xxx.co.jp | 2009/09/01 16:05:30 | └ Re:PROJECT REVIEW MATERIAL | PROJECT REVIEW MATERIAL-20090901_yama1.ppt |
| sato.yoshio@xxx.co.jp | 2009/09/01 17:30:15 | └ Re:PROJECT REVIEW MATERIAL | PROJECT REVIEW MATERIAL-20090901_sato1.ppt REFERENCE DATA 20090902.xls |
| yamada.taro@xxx.co.jp | 2009/09/02 09:55:35 | └ Re:PROJECT REVIEW MATERIAL | REFERENCE DATA 20090902_2.xls |
| sato.yoshio@xxx.co.jp | 2009/09/02 10:20:14 | └ Re:PROJECT REVIEW MATERIAL | REFERENCE DATA 20090902_3.xls |

FIG. 6B

| From | sato.yoshio@xxx.co.jp | suzuki.hanako@xxx.co.jp | sato.yoshio@xxx.co.jp |
|---|---|---|---|
| Date | 2009/09/01 09:05:15 | 2009/09/01 15:20:08 | 2009/09/01 16:28:45 |
| Message-id | 200909010905.nA2608ah004904@xxx.co.jp | 200909011520.D6D0.7497E2D7@xxx.co.jp | 200909011628o.F923JK78@xxx.co.jp |
| In-Reply-To | — | 200909010905.nA2608ah004904@xxx.co.jp | 200909011520.D6D0.7497E2D7@xxx.co.jp |
| To/Cc | yamada.taro@xxx.co.jp, suzuki.hanako@xxx.co.jp, takahashi.susumu@xxx.co.jp, sato.yoshio@xxx.co.jp | yamada.taro@xxx.co.jp, suzuki.hanako@xxx.co.jp, takahashi.susumu@xxx.co.jp, sato.yoshio@xxx.co.jp | yamada.taro@xxx.co.jp, suzuki.hanako@xxx.co.jp, takahashi.susumu@xxx.co.jp, sato.yoshio@xxx.co.jp, yamamoto.takashi@xxx.co.jp |
| Attached | PROJECT REVIEW MATERIAL-20090901.ppt | PROJECT REVIEW MATERIAL-20090901-2.ppt | PROJECT REVIEW MATERIAL-20090901-3.ppt |

604, 605, 606, 600b

F I G. 7A

| DATA NAME | DATA EXAMPLE | DATA EXAMPLE | DATA EXAMPLE |
|---|---|---|---|
| DOCUMENT IDENTIFIER | D1111111 | D1111111 | D1111111 |
| VERSION IDENTIFIER | V0000001 | V0000002 | V0000003 |
| VERSION NUMBER | 1 | 2 | 3 |
| REAL FILE NAME | PROJECT REVIEW MATERIAL-20090901 | PROJECT REVIEW MATERIAL-20090901-2 | PROJECT REVIEW MATERIAL-20090901-3 |
| EXTENSION | .ppt | .ppt | .ppt |
| SIZE | 217088 | 209866 | 216371 |
| NUMBER OF PAGES | 4 | 4 | 4 |
| CREATED DATE AND TIME | 2009/10/1 16:22 | 2009/10/1 17:44 | 2008/10/2 15:30 |
| UPDATED DATE AND TIME | 2009/10/1 16:22 | 2009/10/1 17:44 | 2008/10/2 15:30 |
| AUTHOR | Suzuki | Suzuki | Suzuki |
| Massage-id | 20090901 0905.nA2608ah004904@xxx.co.jp | 20090901 1520.D6D0.7497E2D7@xxx.co.jp | 20090901 16280.F923JK78@xxx.co.jp |

| DATA NAME | DATA EXAMPLE | DATA EXAMPLE | DATA EXAMPLE |
|---|---|---|---|
| DOCUMENT IDENTIFIER | D1111111 | D1111111 | D1111111 |
| VERSION IDENTIFIER | V0000001 | V0000002 | V0000003 |
| E-MAIL ADDRESS LIST | yamada.taro@xxx.co.jp, suzuki.hanako@xxx.co.jp, takahashi.susumu@xxx.co.jp, sata.yoshio@xxx.co.jp | yamada.taro@xxx.co.jp, suzuki.hanako@xxx.co.jp, takahashi.susumu@xxx.co.jp, sato.yoshio@xxx.co.jp | yamada.taro@xxx.co.jp, suzuki.hanako@xxx.co.jp, takahashi.susumu@xxx.co.jp, sato.yoshio@xxx.co.jp, yamamoto.takashi@xxx.co.jp |

700c

| DATA NAME | DATA EXAMPLE | DATA EXAMPLE |
|---|---|---|
| DOCUMENT IDENTIFIER | D1111111 | D1111234 |
| NUMBER OF VERSIONS | 3 | 4 |
| DOCUMENT NAME | PROJECT REVIEW MATERIAL | REFERENCE DATA |
| EXTENSION OF LATEST VERSION | .ppt | .xls |
| TOTAL SIZE | 6443325 | 25748 |
| CREATED DATE AND TIME | 2009/10/2 16:22 | 2009/10/2 17:11 |
| UPDATED DATE AND TIME | 2009/10/1 10:30 | 2009/10/1 17:52 |
| AUTHOR | Suzuki | Yamamoto |

DESTINATION FOLDER: ZZZ CENTER > XXX PROJECT > PROJECT REVIEW
LOG-IN ID : suzuki        PASSWORD : ********
Message-Id:<200909010905.nA2608ah004904@xxx.co.jp>
Subject: PROJECT REVIEW MATERIAL
To/Cc:yamada.taro@xxx.co.jp,suzuki.hanako@xxx.co.jp,
takahashi.susumu@xxx.co.jp,sato.yoshio@xxx.co.jp
Attachment: PROJECT REVIEW MATERIAL -20090901.ppt
Parent_Id:

801

DESTINATION FOLDER: ZZZ CENTER > XXX PROJECT > PROJECT REVIEW
LOG-IN ID :suzuki        PASSWORD : ********
Message-Id:<200909011520.D6D0.7497E2D7@xxx.co.jp>
Subject:Re: PROJECT REVIEW MATERIAL
To/Cc:yamada.taro@xxx.co.jp,suzuki.hanako@xxx.co.jp,
takahashi.susumu@xxx.co.jp,sato.yoshio@xxx.co.jp
Attachment: PROJECT REVIEW MATERIAL -20090901-2.ppt
Parent_Id:<200909010905.nA2608ah004904@xxx.co.jp>

802

DESTINATION FOLDER: ZZZ CENTER > XXX PROJECT > PROJECT REVIEW
LOG-IN ID :suzuki        PASSWORD : ********
Message-Id:<2009090116280.F923JK78@xxx.co.jp>
Subject:Re: PROJECT REVIEW MATERIAL
To/Cc:yamada.taro@xxx.co.jp,suzuki.hanako@xxx.co.jp,
takahashi.susumu@xxx.co.jp,sato.yoshio@xxx.co.jp,
yamamoto.takashi@xxx.co.jp
Attachment: PROJECT REVIEW MATERIAL -20090901-3.ppt
Parent_Id:<200909011520.D6D0.7497E2D7@xxx.co.jp>,
<200909010905.nA2608ah004904@xxx.co.jp>

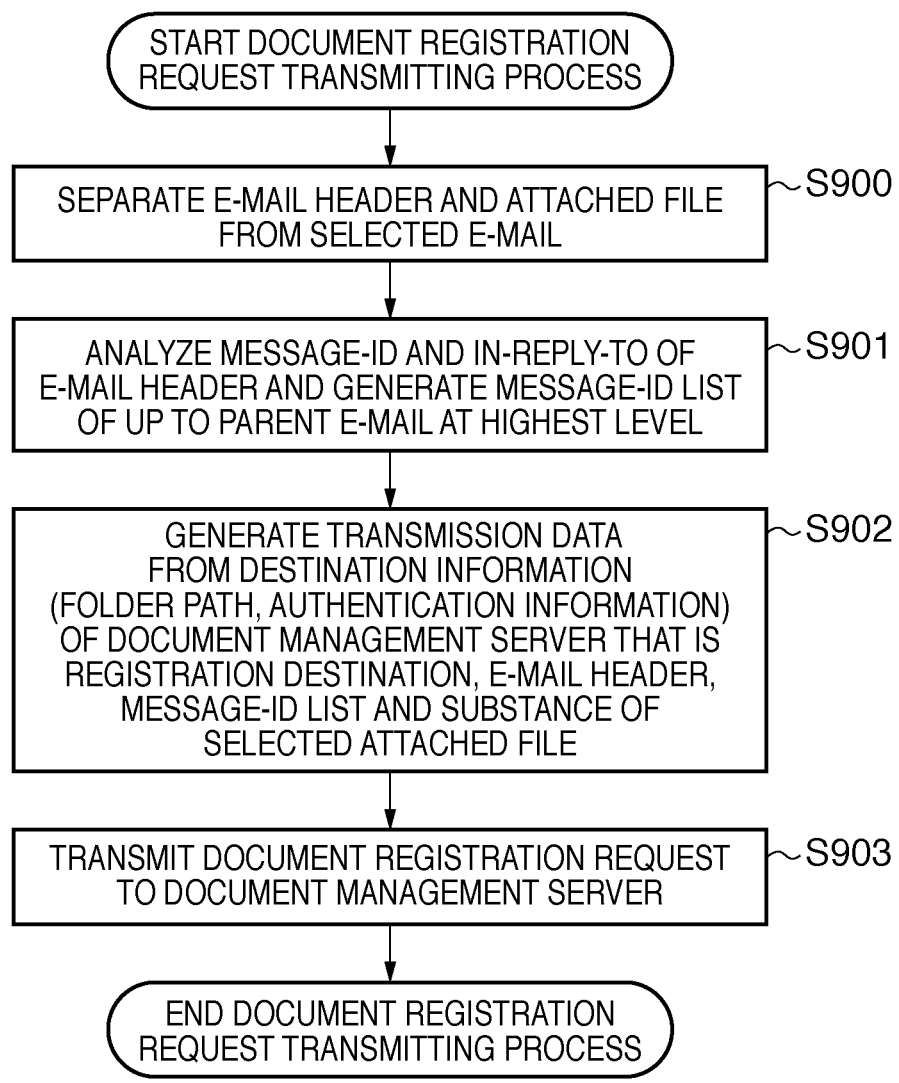

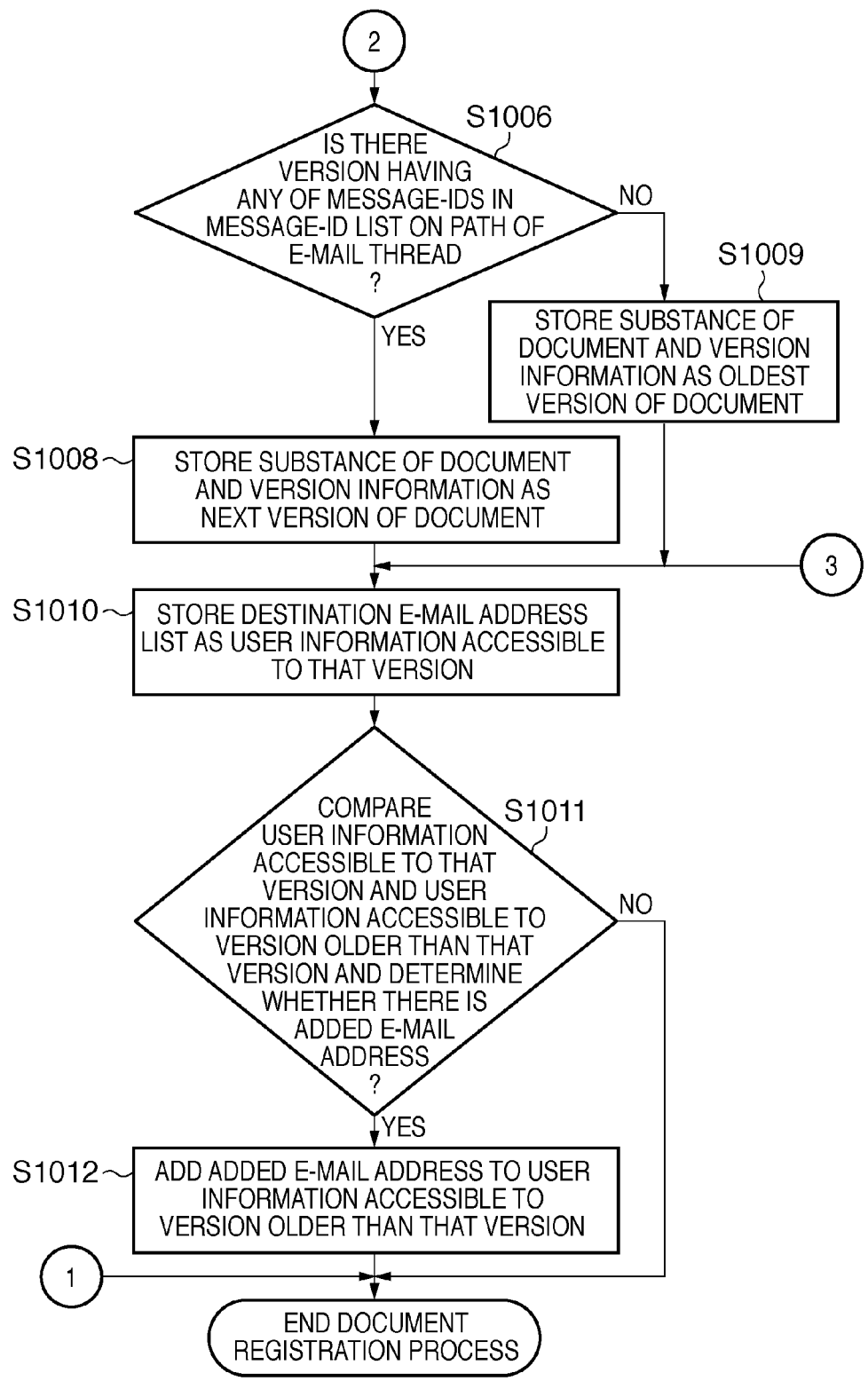

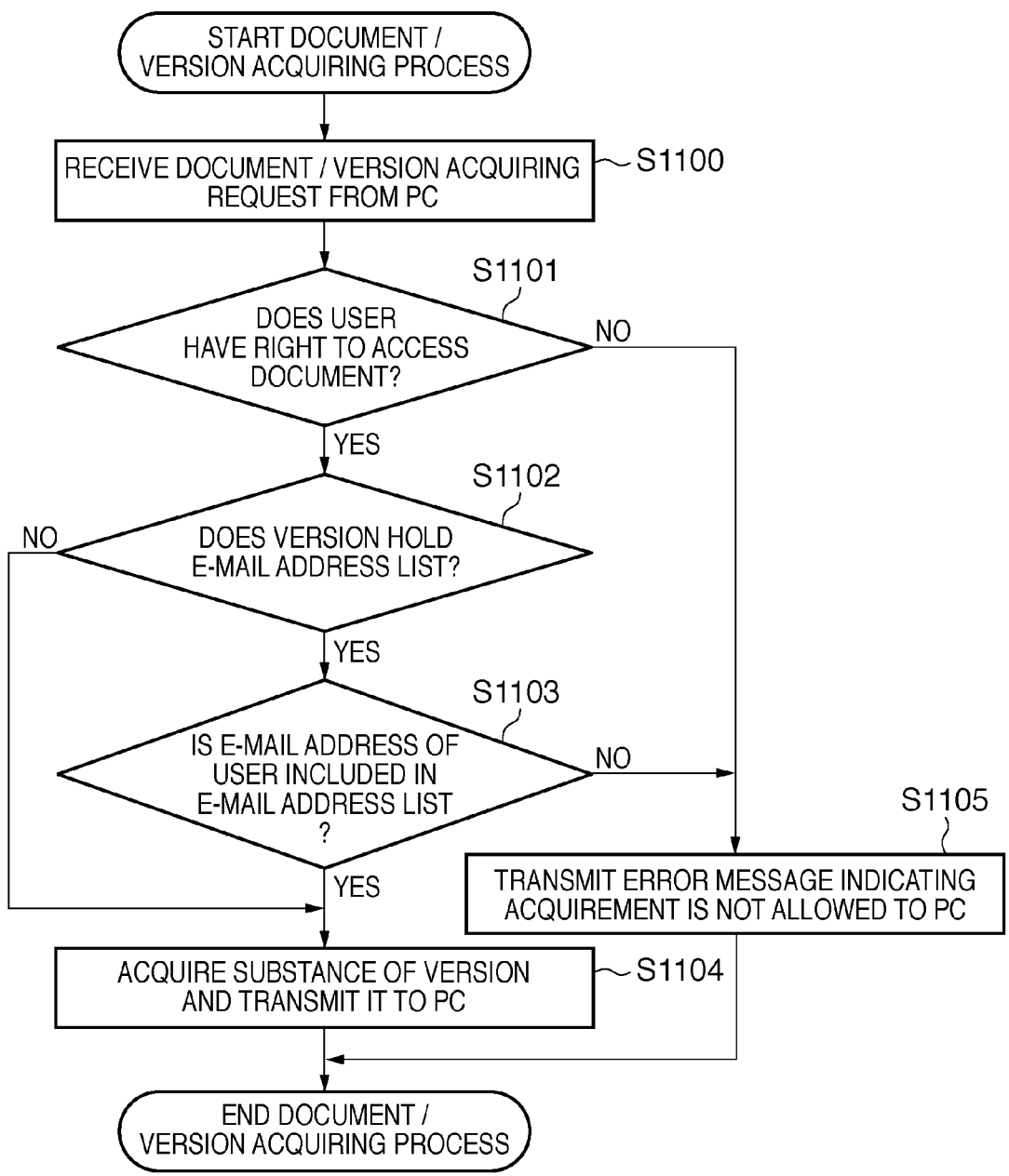

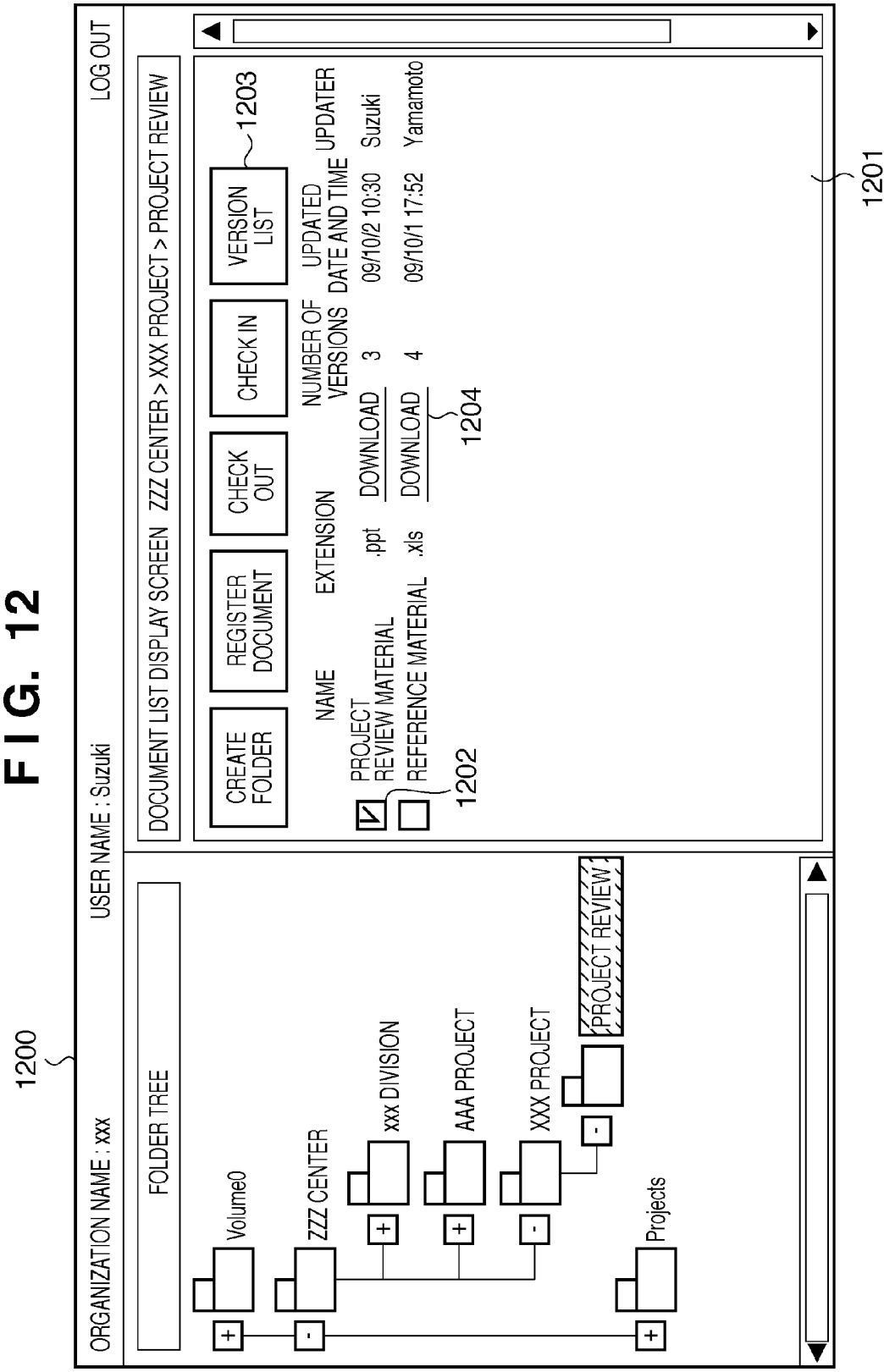

FIG. 13

| | | | | |
|---|---|---|---|---|
| ORGANIZATION NAME : xxx | USER NAME : Suzuki | DOCUMENT NAME: PROJECT REVIEW MATERIAL | | LOG OUT |

1300

VERSION LIST DISPLAY SCREEN

1303

DELETE

| NAME | | EXTENSION | VERSION NO. | UPDATED DATE AND TIME | UPDATER |
|---|---|---|---|---|---|
| ☐ PROJECT REVIEW MATERIAL-20090901 | DOWNLOAD | .ppt | 1 | 09/10/01 16:22 | Suzuki |
| ☐ PROJECT REVIEW MATERIAL-20090901-2 | DOWNLOAD | .ppt | 2 | 09/10/01 17:44 | Suzuki |
| ☐ PROJECT REVIEW MATERIAL-20090901-3 | DOWNLOAD | .ppt | 3 | 09/10/02 10:30 | Suzuki |

1302

1301

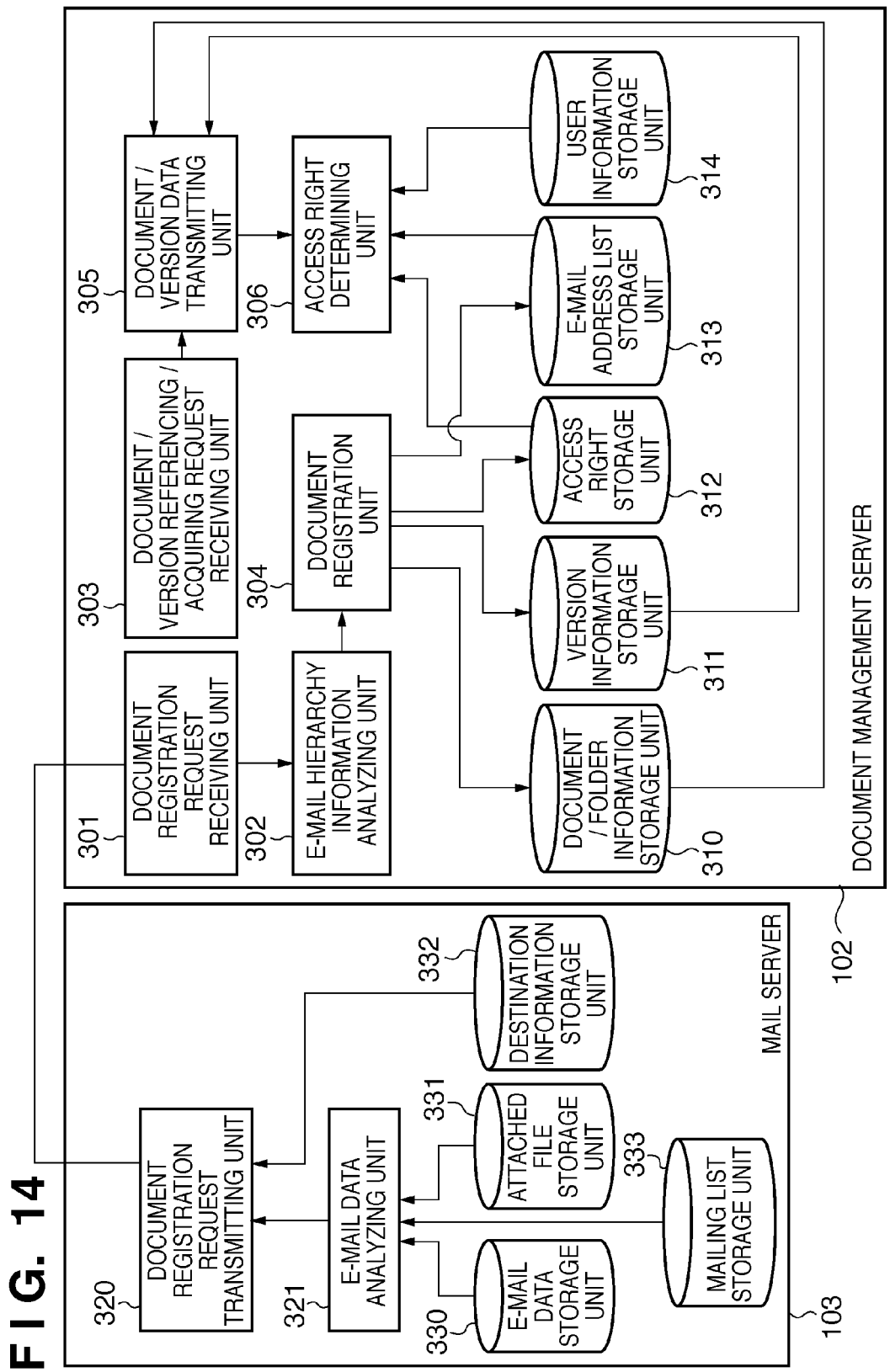

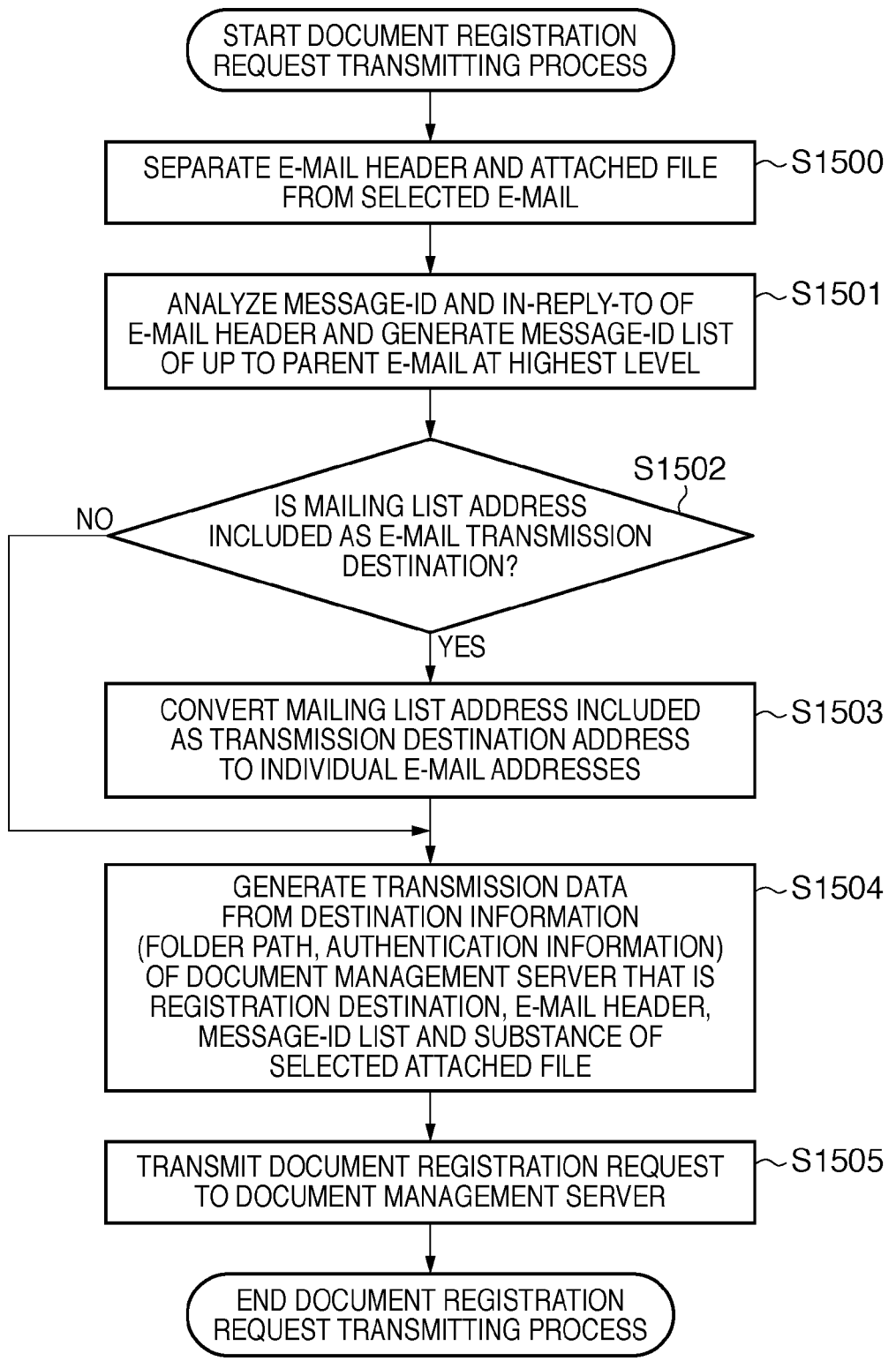

DOCUMENT DATA SHARING SYSTEM AND USER APPARATUS

BACKGROUND OF THE INVENTION

1. Field of the Invention

The present invention relates to a technique for sharing and managing document data, particularly attached files to electronic mail (e-mail).

2. Description of the Related Art

Various types of document data management systems that include a client/server type application or a WWW (World Wide Web)-based application are used in recent years. In such a document management system, generally, personal computers (hereinafter referred to as PCs) handle electronic documents (hereinafter referred to as document data) by using a dedicated client application or a web browser. With the document management system, folders and documents are hierarchically managed, and the document management system is used to share the documents by granting users different access rights to the folders and documents.

Meanwhile, electronic mail (hereinafter referred to as e-mail) is an essential means for performing business operations, and is widely used as an information sharing means. E-mail is also used as a file sharing means by attaching a document file thereto. Also, WWW-based e-mail transmission/receipt systems (hereinafter referred to as web mail) are also widely used, and transmission and receipt of e-mail is possible even in an environment in which client software (hereinafter referred to as a mailer) cannot be used.

Generally, e-mail is stored in a data storage area secured for each e-mail address. In other words, e-mail is not designed to be shared with other users, and access rights are managed as data specific to each individual. Accordingly, in transmission and receipt of documents by e-mail, when editing operations of a single document are cooperatively performed, management of update history becomes cumbersome. Also, in order for a user added as a destination to reference a file attached to a past e-mail, it is necessary to resend the past e-mail when sending a reply.

For the purpose of addressing the problem described above, a technique has been proposed in Japanese Patent Laid-Open No. 2006-330899 (Patent Document 1) in which mutually related e-mails and attached files are extracted from an e-mail storage area, and a set of e-mails and a set of attached files are associated and stored.

However, according to the technique described in Patent Document 1, the sequence of e-mails and the file set (the set of attached files) are related and collectively stored in the storage area. Accordingly, there is a possibility that modification management of the files that have been saved in the storage area might become cumbersome. Also, when a shared folder is used as the storage area, there is a possibility that the stored e-mails and attached files might be referenced by users other than those the sender intended. In other words, there is a problem in that management of a modification history of attached files (version management) and setting of access rights cannot be performed appropriately.

The present invention provides a more preferable management technique for sharing document data attached to e-mail.

SUMMARY OF THE INVENTION

According to one aspect of the present invention, a document data sharing system including a user apparatus that transmits and receives e-mail and a server apparatus that hierarchizes and registers different versions of document data and provides the document data to the user apparatus, wherein an e-mail transmitted and received by the user apparatus includes at least identification information for uniquely identifying the e-mail, and further includes, when the e-mail is a reply to another e-mail, reply identification information indicating the identification information of the other e-mail, the user apparatus comprises a transmitting unit that, when registering document data attached to a received e-mail in the server apparatus, examines the reply identification information of the e-mail to which the document data has been attached, thereby generating a list of identification information of one or more past e-mails related to the e-mail and transmitting a registration request including the list to the server apparatus, and the server apparatus comprises a registration unit that determines a version of document data to be registered indicated by the registration request based on the identification information in the list included in the registration request received from the user apparatus and registers the document data in a corresponding hierarchical position.

According to another aspect of the present invention, a user apparatus that makes a request to register document data attached to e-mail to a server apparatus that hierarchizes and registers different versions of document data, wherein an e-mail transmitted and received by the user apparatus includes at least identification information for uniquely identifying the e-mail, and further includes, when the e-mail is a reply to another e-mail, reply identification information indicating the identification information of the other e-mail, the user apparatus comprises: a generating unit that, when registering document data in the server apparatus, examines the reply identification information of an e-mail to which the document data has been attached, thereby generating a list of identification information of one or more past e-mails related to the e-mail; and a transmitting unit that transmits a registration request including the generated identification information list to the server apparatus, and the server apparatus is configured to determine a version of document data to be registered indicated by the registration request based on the identification information in the list included in the registration request received from the user apparatus and registers the document data in a corresponding hierarchical position.

According to the present invention, it is possible to provide a more preferable management technique for sharing document data attached to e-mail.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing a folder hierarchical structure in the document management server and an example of the status of rights to access the folders.

FIG. 5 is a diagram showing an example of a user information table in the document management server.

FIGS. 6A and 6B are diagrams showing examples of e-mails received by a mailer.

FIGS. 7A and 7B are diagrams showing examples of various tables used by the document management server.

FIG. 8 is a diagram showing examples of parameters transmitted as document data registration requests.

FIG. 9 is a flowchart illustrating an example of a process for transmitting a document data registration request performed by the PC.

FIGS. 10A and 10B are flowcharts illustrating an example of a process performed by the document management server upon receiving a document registration request.

FIG. 11 is a flowchart illustrating an example of a process performed by the document management server upon receiving a document data/version referencing/acquiring request.

FIG. 12 is a diagram showing an example of displaying a list of shared document data.

FIG. 13 is a diagram showing an example of displaying a list of versions of document data.

FIG. 14 is a block diagram showing an example of a schematic functional configuration of a document management server and a mail server.

FIG. 15 is a flowchart illustrating an example of a process for transmitting a document data registration request performed by the mail server.

DESCRIPTION OF THE EMBODIMENTS

Hereinafter, preferred embodiments of the present invention will be described in detail with reference to the drawings. It is to be understood that the embodiments given below are merely examples and are not intended to limit the scope of the present invention.

In the following description, the term "document data" refers to a unit for managing one or more files and means an object for managing information attached to the one or more files. Also, the term "version" refers to a unit for managing a single file and means an object for managing information attached to the file. In other words, document data includes one or more versions.

First Embodiment

A document data sharing system according to a first embodiment of the present invention will be described below taking a system that manages and shares document data attached to e-mail as an example.

System Configuration

Figure 1:
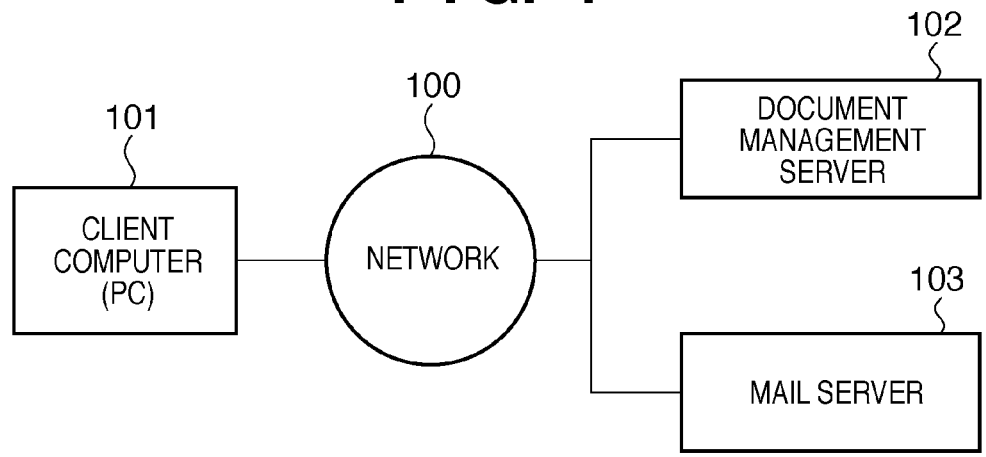
FIG. 1 is a diagram showing an example of a configuration of a document data sharing system according to a first embodiment.

FIG. 1 is a diagram showing an example of a configuration of a document data sharing system. The document data sharing system includes a client computer (PC) 101 (user apparatus), a document management server 102 (server apparatus) and a mail server 103. The PC 101, the document management server 102 and the mail server 103 are connected to each other via a network 100 such as the Internet or a LAN (Local Area Network).

The PC 101 is a client computer device used by a user such as a personal computer (PC).

In the PC 101, an ordinary mailer for transmitting and receiving e-mail and an ordinary browser for accessing a Web server have been installed. The PC 101 uses the mailer to connect to the mail server 103 so as to transmit and receive e-mail. The mailer performs editing of e-mail before transmission, as well as referencing and managing received e-mails and attached files. Furthermore, in the first embodiment, the mailer has a function of transmitting a registration request to the document management server 102 so as to manage and share the received e-mails and attached files. The registration request function will be described later in detail.

Also, the PC 101 uses the browser to connect to the document management server 102 so as to perform processing such as browsing, updating and deleting of the folders and document data managed and shared by the document management server 102. The first embodiment will be described taking an example in which the PC 101 uses a web browser to access the document management server 102, but use of the web browser is not necessarily needed. For example, it is also possible to use a configuration in which client application software dedicated to the document management server 102 is installed in the PC 101 and the client application software is used to access the document management server 102.

The document management server 102 is an apparatus for managing and sharing various types of document data. Hereinafter, an example will be described in which document data attached to e-mail received by the PC 101 is managed and shared, but it is also possible to manage and share the document data together with other document data.

The mail server 103 is an apparatus for transmitting and receiving e-mail in response to a request from the mailer of the PC 101. The first embodiment will be described taking an example in which the mail server 103 and the document management server 102 are configured as separate apparatuses, but the document management server 102 and the mail server 103 may be configured as the same apparatus.

As for e-mail, for example, in accordance with RFC 2822, which is the standard for the format of e-mail messages, identification information (Message-id) that can uniquely identify an e-mail is assigned to the header of the e-mail, and the e-mail is distributed. Then, in the header of a reply e-mail to the e-mail, reply identification information (In-Reply-To) indicating the identification information of the e-mail to which the reply is to be sent is set, and the reply e-mail is distributed. The mailer can thereby hierarchically manage and display a series of received e-mails that are related (also referred to as a thread).

Figure 2:
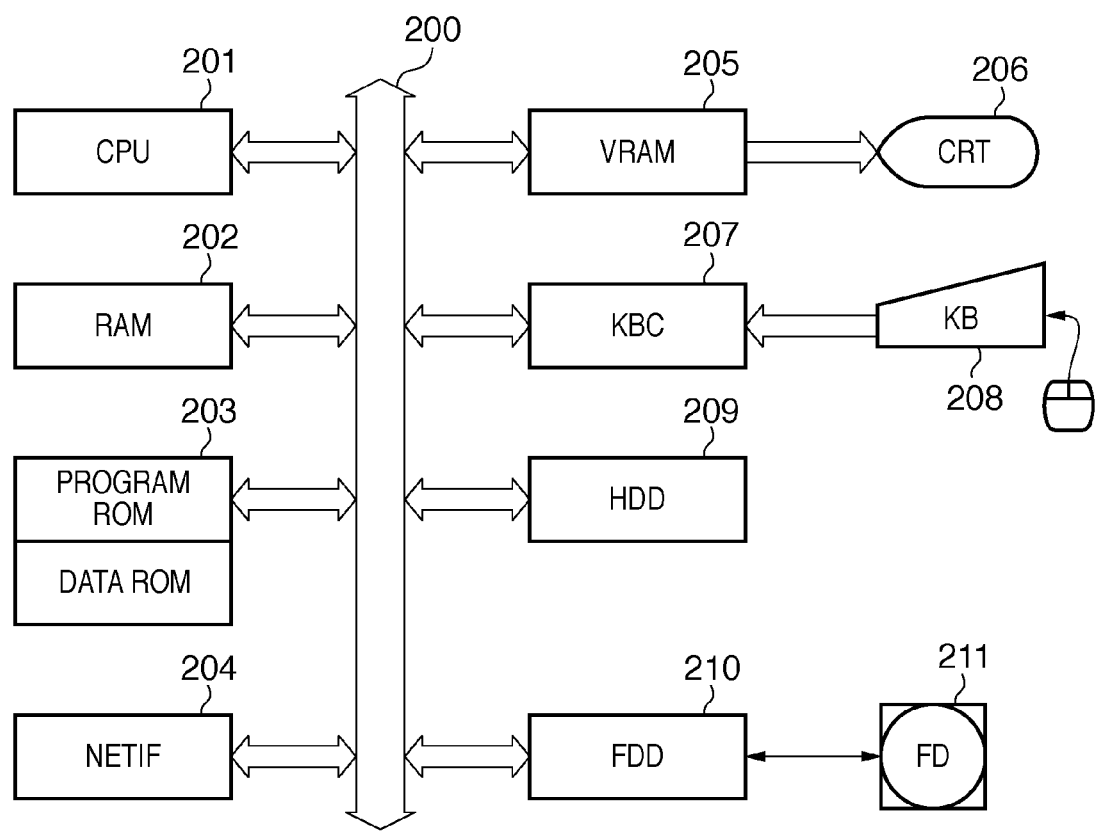
FIG. 2 is a diagram showing an example of an internal configuration of an information processing apparatus provided in the document data sharing system.

FIG. 2 is a diagram showing an example of an internal configuration of the document management server 102.

A central processing unit (CPU) 201 performs operations and control of various units of the document management server 102. A random access memory (RAM) 202 functions as the main memory of the CPU 201. The RAM 202 functions as an area for storing an execution program, an area for executing the execution program, and a data area for the execution program.

A read-only memory (ROM) 203 stores operation processing procedures performed by the CPU 201. The ROM 203 includes a program ROM in which an operating system (OS), which is a system program for controlling the devices of the information processing apparatus, has been recorded and a data ROM in which information and the like necessary to run the system have been recorded. Instead of the ROM 203, a HDD 209 may be used, which will be described later.

A network interface (NETIF) 204 performs control to transfer data to external apparatuses via the network 100 and performs diagnostics of its connection status to the network 100. A video RAM (VRAM) 205 expands an image for being displayed on a screen of a CRT 206, which will be described later, and performs control to display the image.

A display apparatus (CRT) 206 can be, for example, a display that displays the operation status or the like of the information processing apparatus. A keyboard controller (KBC) 207 is a controller for controlling an input signal from a KB 208, which will be described below. The external input apparatus (KB) 208 is an apparatus for receiving user operations. For example, a keyboard or a pointing device such as a mouse can be used as the KB 208.

The hard disk drive (HDD) 209 saves various types of data and an application program that executes various types of processing units. An external input/output apparatus 210 is an apparatus that inputs and outputs data to and from a removable disk such as a magnetic recording medium including a flexible disk (FD), an optical recording medium including a CD-ROM or a magneto-optical recording medium including an MO, or a semiconductor recording medium such as a memory card. For example, the external input/output apparatus 210 is used to read the above-described application program or the like from a recording medium. A removable medium 211 is a detachable data recording medium that stores data read by the FDD 210. The removable medium 211 can be, for example, a magnetic recording medium (for example, a flexible disk (FD)), an optical recording medium (for example, a CD-ROM), a magneto-optical recording medium (for example, an MO) or a semiconductor recording medium (for example, a memory card).

FIG. 2 shows an example in which the document management server 102 is made up of a single information processing apparatus, but it may be made up of a plurality of information processing apparatuses.

Figure 3:
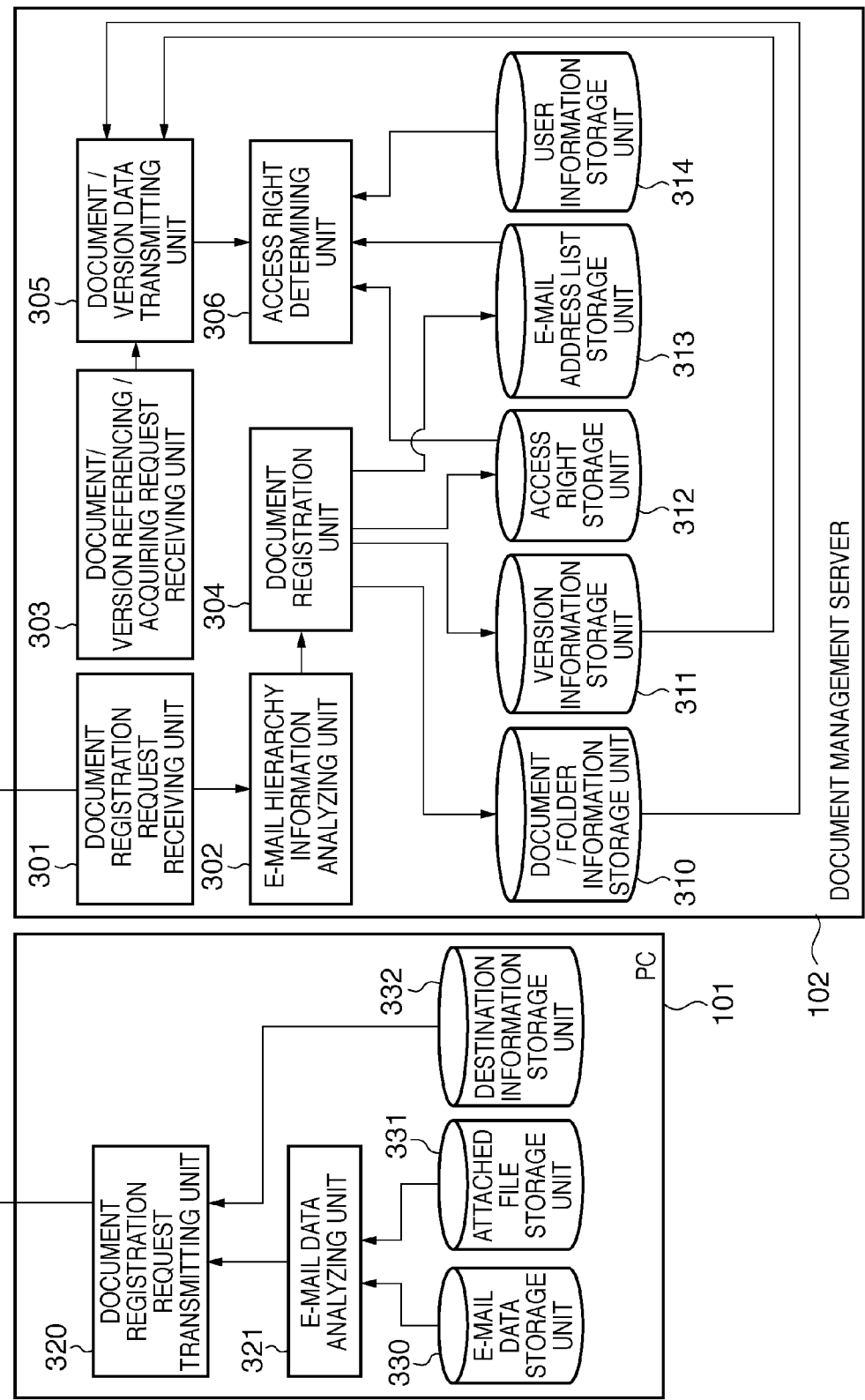
FIG. 3 is a block diagram showing an example of a schematic functional configuration of a document management server and a client computer (PC).

FIG. 3 is a block diagram showing an example of a schematic functional configuration of the PC 101 and the document management server 102. The document management server 102 includes various types of information processing units and information storage units. The document management server 102 is configured to hierarchically manage cabinets, folders, document data and versions. A known configuration can be used as the configuration of the document management server 102, and thus a detailed description thereof is omitted here. In the first embodiment, it is assumed that user information accessible to any cabinet, folder, document and information thereof has been registered in advance in the document management server 102. Information processing units 301 to 306 execute processing in response to a request from the PC 101. The information processing units 301 to 306 read and write information to and from information storage units 310 to 314.

In the PC 101, a document registration request transmitting unit 320 and an e-mail data analyzing unit 321 execute processing designated by a user operation or according to the function of the mailer. The document registration request transmitting unit 320 and the e-mail data analyzing unit 321 read and write information to and from information storage units 330 to 332. A description of the basic processing elements of the mailer and the browser is omitted here. The document registration request transmitting unit 320 and the e-mail data analyzing unit 321 may be configured as a part of the program of the mailer, or they may be a program independent of the mailer.

In the following description, it is assumed that e-mail data corresponding to received e-mails and attached files have already been stored in the e-mail data storage unit 330 and the attached file storage unit 331. It is also assumed that information (the identifier of the document management server, folder paths, authentication information and the like) necessary to transmit a document data registration request to the document management server 102 has been stored in the destination information storage unit 332. It is also assumed that information (user information, folder hierarchies, documents) necessary to configure the document management server 102 has been stored in advance in each of the information storage units 310 to 312 of the document management server 102.

The information processing units shown in FIG. 3 can be implemented by the CPU 201 executing the program stored in the HDD 209. Each information processing unit and the operations and functions of the information processing units will be described with reference to flowcharts.

Apparatus Operation

The following description will be given taking an example in which document data attached to e-mails exchanged by seven users listed in a table 402 shown in FIG. 4 is registered in the document management server 102 and shared. It is assumed that the seven users belong to a department named as ZZZ Center and participate in XXX Project.

FIG. 4 is a diagram showing a folder hierarchical structure in the document management server 102 and an example of the status of rights to access the folders. It is assumed that, for example, the right to modify a "XXX Project" folder has been granted to all of the users of the document management server 102, and the right to modify a "Project Review" folder has been assigned to the seven users listed in the table 402. In other words, the seven users can read and write to any of the documents in the "Project Review" folder. Here, documents are assumed to be registered in the "Project Review" folder in a folder hierarchy 400.

FIG. 5 is a diagram showing an example of user information (log-on account) data of the seven users listed in the table 402 used to access the document management server 102. It is assumed that data including user ID, user name, log-in ID, password and e-mail address has been stored. The data configuration may be different from the above configuration, but it is desirable to use data in which log-on accounts and e-mail addresses have been associated.

In FIG. 6A, a table 600a shows examples of e-mails received by the mailer of the PC 101. In FIG. 6B, a table 600b shows examples of headers of e-mails 601, 602 and 603. As can be seen from the subject column of the table 600a, these e-mails belong to the same thread.

The e-mail 601 is at the highest level of an e-mail hierarchy, and a file "Project Review Material-20090901.ppt" has been attached. The sender of the e-mail 601, destination e-mail addresses and identification information of the e-mail (Message-id) are as shown in e-mail header information 604.

The e-mail 602 is a reply e-mail to the e-mail 601, and a file "Project Review Material-20090901-2.ppt" has been attached. The sender of the e-mail 602, destination e-mail addresses, identification information of the e-mail (Message-id) and reply identification information (In-Reply-To) indicating to which e-mail the reply was made are as shown in e-mail header information 605.

The e-mail 603 is a reply e-mail to the e-mail 602, and a file "Project Review Material-20090901-3.ppt" has been attached. The sender of the e-mail 603, destination e-mail addresses, identification information of the e-mail (Message-id) and reply identification information (In-Reply-To) indicating to which e-mail the reply was made are as shown in e-mail header information 606. In the destination column of the header information 606 of the e-mail 603, one e-mail address has been added to the destination e-mail addresses of the e-mails 601 and 602.

Document Data Registration Request Process

FIG. 9 is a flowchart illustrating a process for transmitting a registration request for registering the document data attached to the three e-mails described above in the document management server 102. The following steps are executed by the PC 101.

In step S900, for example, when triggered by a user selecting the file "Project Review Material-20090901.ppt" attached to the e-mail 601, a document registration request process starts. Upon start of the document registration request process, the e-mail data analyzing unit 321 reads out the e-mail data and the attached file from the e-mail data storage unit 330 and the attached file storage unit 331. Furthermore, the e-mail header information is separated from the e-mail data.

In step S901, the e-mail data analyzing unit 321 examines the identification information (Message-id) of the e-mail and the reply identification information (In-Reply-To) and extracts Message-ids of e-mails up to the highest level (least recently) of the e-mail hierarchy (thread). Then, the e-mail data analyzing unit 321 generates a Message-id list. The e-mail 601 is at the highest level of the e-mail hierarchy, and thus an empty list is generated for the e-mail 601.

In step S902, the document registration request transmitting unit 320 reads out destination information in the document management server 102 from the destination information storage unit 332. Furthermore, the document registration request transmitting unit 320 generates transmission data from the destination information, the e-mail header, the identification information list and the attached file.

FIG. 8 is a diagram showing an example of the generated transmission data. Transmission data 800 is data generated when the file "Project Review Material-20090901.ppt" attached to the e-mail 601 was selected. As described above, the e-mail 601 is the e-mail at the highest level, and thus the Message-id list is empty. Transmission data 801 is data generated when the file "Project Review Material-20090901-2.ppt" attached to the e-mail 602 was selected. Because the e-mail 601, which is the parent e-mail of the e-mail 602, is at the highest level, only the identification information of the e-mail 601 (one piece of information) has been set in the Message-id list. Transmission data 802 is data generated when the file "Project Review Material-20090901-3.ppt" attached to the e-mail 603 was selected. The identification information of the e-mail 602, which is the parent e-mail of the e-mail 603, and the identification information of the e-mail 601 (two pieces of information) have been set in the Message-id list.

In step S903, the document registration request transmitting unit 320 transmits the transmission data generated in S902 to the document management server 102 via the network 100.

Document Data Registration Request Accepting Process

Figure 10A:
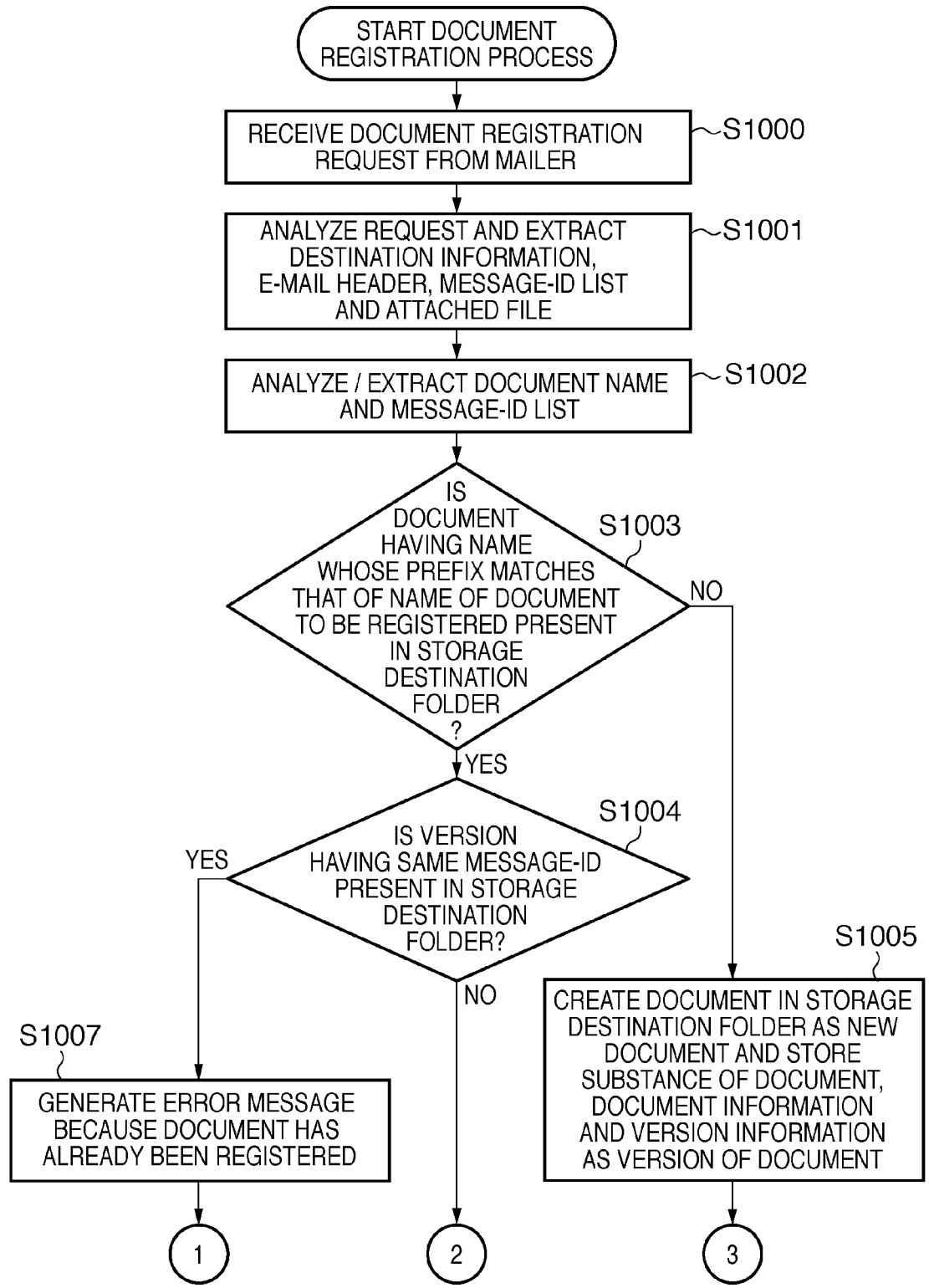

FIGS. 10A and 10B are flowcharts illustrating a process performed by the document management server 102 upon receiving a document registration request. The following steps are implemented by, for example, the CPU 201 executing the control program stored in the HDD 209.

In step S1000, the document registration request receiving unit 301 receives a document registration request transmitted from the PC 101. Then, in step S1001, the document registration request receiving unit 301 expands the destination information, the e-mail header and the Message-id list in the RAM 202 from the document registration request, and stores the attached file in a temporary area of the HDD 209. Furthermore, in step S1002, the registration destination folder, the authentication information and the document information are extracted from the destination information and expanded in the RAM 202 by the document registration request receiving unit 301, and the process is passed on to the e-mail hierarchy information analyzing unit 302.

In step S1003, the e-mail hierarchy information analyzing unit 302 reads out the registration destination folder and the document information from the RAM 202, and then references the version information storage unit 311 so as to determine whether or not document data having a file name similar to the file name extracted from the document information is already present in the registration destination folder. Various existing techniques can be used to determine whether the file names are similar. For example, a rule can be applied such as whether the first ten characters of the names match. As a result of the determination, if it is determined that document data having a similar file name is not present, the procedure advances to step S1005. If it is determined that document data having a similar file name is present, the procedure advances to step S1004. In step S1005, in order to register new document data in the registration destination folder, the document registration unit 304 stores related document information, version information and substance of the attached file in the document/folder information storage unit 310 and the version information storage unit 311.

In step S1004, in order to determine whether or not a version associated with the same Message-id is present (has been registered), the e-mail hierarchy information analyzing unit 302 references the version information storage unit 311. As a result of the determination, if it is determined that a version having the same Message-id is present, the procedure advances to S1007, where the document registration request receiving unit 301 stops the document registration process and transmits an error message indicating that the document data cannot be registered to the PC 101. If, on the other hand, it is determined that a version having the same Message-id is not present, the procedure advances to step S1006.

In step S1006, in order to determine whether or not a version associated with a Message-id included in the Message-id list is present (has been registered), the e-mail hierarchy information analyzing unit 302 references the version information storage unit 311. As a result of the determination, if it is determined that there is no such a version, the procedure advances to S1009. If it is determined that there is such a version, the procedure advances to S1008.

In step S1008, the document registration unit 304 stores the substance of the file and the version information in the version information storage unit 311 as the next version of the already existing document data, and the procedure advances to step S1010. On the other hand, in step S1009, the document registration unit 304 adds the document data as the oldest (highest) version of document data and stores the substance of the file and the version information in the version information storage unit 311, and the procedure advances to step S1010.

In step S1010, the document registration unit 304 acquires a destination e-mail address list from the e-mail header read out from the RAM 202 and stores the list in the e-mail address list storage unit 313 together with the version identifier. Then, in step S1011, the document registration unit 304 compares the e-mail address list of the added version and the e-mail address list of the existing version, and determines whether or not there is a difference between the e-mail addresses of the added version and those of the existing version. As a result of the determination, if it is determined that there is no difference, the document registration unit 304 ends the process and passes the process on to the document registration request receiving unit 301. On the other hand, if it is determined that there is a difference, in step S1012, in the e-mail address list of the new version, a newly added e-mail address is added to the e-mail address list of the old version, and the list is stored in the e-mail address list storage unit 313.

When the document registration process described above has been executed for the e-mails 601, 602 and 603, document data registration tables are generated. Tables 700a and 700b shown in FIGS. 7A and 7B are examples of registration tables in which three versions of document data identified by a document identifier "D1111111" have been registered. Specifically, mutually different version identifiers "V0000001", "V0000002" and "V0000003" have been assigned to the document data having the same document identifier "D1111111". In other words, each attached file is sequentially registered in the corresponding hierarchical position according to the hierarchical structure of the e-mail thread, and thereby different versions are hierarchized and registered. A table 700c shown in FIG. 7B is an example of a registration table in which two pieces of document data identified by mutually different document identifiers "D1111111" and "D1111234" have been registered.

In the above description, the version of document data to be registered is determined based on a comparison between the identification information in the Message-id list and the identification information associated with the already registered document data. However, more simply, the version may be determined based on the number of pieces of identification information in the Message-id list.

Registered Document Data Referencing And Acquiring Process

FIG. 11 is a diagram illustrating a process for referencing and acquiring registered document data. The following steps are executed by the document management server 102 and implemented by, for example, the CPU 201 executing the control program stored in the HDD 209. Here, a process performed when a referencing/acquiring request is sent from the PC 101 via the browser will be described.

In step S1100, the document/version referencing/acquiring request receiving unit 303 of the document management server 102 receives a document/version referencing/acquiring request from the browser of the PC 101, and passes the process on to the document/version data transmitting unit 305.

In step S1101, in order to determine whether the user has the right to access the document, the document/version data transmitting unit 305 passes the process on to the access right determining unit 306. Furthermore, the access right determining unit 306 acquires information necessary to determine the access rights from the access right storage unit 312 and the user information storage unit 314 and expands the information in the RAM 202. The access right determining unit 306 compares the user information and the document information to the access right information acquired from the RAM 202. If the user has the right to access the document, the procedure advances to S1102. If, on the other hand, the user does not have access rights, the process is passed on to the document/version data transmitting unit 305, and the procedure advances to S1105.

In step S1102, in order to determine whether or not the version to be referenced and acquired holds an e-mail address list, the access right determining unit 306 acquires an e-mail address list from the e-mail address list storage unit 313 by using the version identifier as a key. If an e-mail address list can be acquired, the e-mail address list is expanded in the RAM 202, and the procedure advances to step S1103. If an e-mail address list cannot be acquired, the process is passed on to the document/version data transmitting unit 305, and the procedure advances to S1104.

In step S1103, the access right determining unit 306 acquires the e-mail address of the user from the user information storage unit 314 by using the identifier of the user as a key and determines whether or not the e-mail address is included in the e-mail address list expanded in the RAM 202. As a result of the determination, if it is determined that the e-mail address is included in the e-mail address list, the procedure advances to S1104. If it is determined that the e-mail address is not included in the e-mail address list, the procedure advances to S1105.

In step S1104, the document/version data transmitting unit 305 acquires the substance of the version of the document data and the information regarding the document and the version from the document/folder information storage unit 310 and the version information storage unit 311, and transmits these to the browser of the PC 101. On the other hand, in step S1105, the document/version data transmitting unit 305 transmits a message indicating that acquirement is not allowed to the browser of the PC 101.

FIGS. 12 and 13 are diagrams showing an example of a document list display screen and an example of a version list display screen displayed on the browser of the PC 101. For example, when a version list button 1203 shown in FIG. 12 is clicked, a version list display screen 1300 is displayed. In FIG. 13, three mutually different versions of documents are displayed. Here, "name" provides the hierarchical position and version information of each document to the user.

For example, in a document list display screen 1200, when a download button link 1204 in the document list is clicked, the latest version of the file is acquired (downloaded) from the document management server 102. Also, in the version list display screen, when a download link 1302 is clicked, the designated version of the file is acquired from the document management server 102.

As described above, according to the first embodiment, when registering document data, the PC 101 transmits an e-mail identification information list related to the e-mail to which the document data has been attached to the document management server 102. Thus, the document management server 102 can determine and register the version of document data requested for registration by using the identification information list.

Also, the PC 101 transmits an e-mail address list in which e-mail addresses have been set as destinations of the e-mail to which the document data requested for registration was attached to the document management server 102. Thus, the document management server 102 can set the right to access the document data requested for registration by using the e-mail address list. Accordingly, more efficient management of versions of document data is possible, and more appropriate security management can be implemented.

Second Embodiment

In a second embodiment, an example will be described in which a document registration request is transmitted from the mail server 103 having a web mail function. In particular, a situation will be described in which a mailing list function is used that distributes e-mail simultaneously to one or more users using a representative e-mail address associated with the one or more users.

FIG. 14 is a block diagram showing a functional configuration of the document management server 102 and the mail server 103. The main difference is that a mailing list storage unit 333 storing a table in which one or more users have been associated with a representative e-mail address (mailing list address) has been added. In other words, the mail server 103 itself has the mailing list function, and thus even when a mailing list address has been designated as a destination, the final destinations can be specified by referencing the mailing list storage unit 333.

FIG. 15 is a flowchart illustrating a process for transmitting a document registration request performed by the mail server 103 according to the second embodiment. The processes of step S1504 and the subsequent step and the processes of step S1501 and the prior step are the same as those of the first embodiment, and thus a description thereof is omitted here. A description of the basic functions of web mail is also omitted here.

In step S1502, the document registration request transmitting unit 320 determines whether a mailing list address stored in the mailing list storage unit 333 is included in the e-mail header as a destination. As a result of the determination, if it is determined that a mailing list address is included, the procedure advances to S1503. If it is determined that a mailing list address is not included, the procedure advances to S1504.

In step S1503, the document registration request transmitting unit 320 reads out the e-mail addresses of the corresponding individuals from the mailing list storage unit 333 by using the mailing list address determined to be included in the header as a key. Then, the mailing list address included in the header as a destination is converted to the e-mail address or e-mail addresses of one or more individuals, which are then expanded in the RAM 202. Then, the procedure advances to the next step S1504.

As described above, by converting a mailing list address designated as a destination to individual e-mail addresses, restrictions to access registered document data can be set more suitably.

The foregoing has described an example in which the mailing list storage unit 333 is provided in the mail server 103, but a mailing list storage unit may be provided as an external apparatus accessible from the mail server 103.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-167476, filed Jul. 26, 2010, which is hereby incorporated by reference herein in its entirety.

What is claimed is:

1. A document data sharing system including a user apparatus that transmits and receives e-mail and a server apparatus that registers different versions of document data and provides the document data to the user apparatus, wherein an e-mail received by the user apparatus includes at least identification information for uniquely identifying the e-mail, and further includes, when the e-mail is a reply to other e-mail, reply identification information indicating the identification information of the other e-mail, the user apparatus comprises a transmitting unit that, when registering document data attached to a received e-mail in the server apparatus, examines the reply identification information of the e-mail to which the document data has been attached, thereby generating a list of identification information of one or more past e-mails related to the e-mail and transmitting a registration request including the list and the document data to the server apparatus, and the server apparatus comprises a registration unit that determines a version of the document data to be registered indicated by the registration request based on the identification information in the list included in the registration request received from the user apparatus and registers the document data in a corresponding hierarchical position, wherein the server apparatus further comprises a storage unit that stores a table in which e-mail addresses and log-on accounts for the server apparatus have been associated, the registration request further includes an e-mail address list in which e-mail addresses have been set as destinations of the e-mail to which the document data to be registered indicated by the registration request was attached, and the registration unit sets a log-on account accessible to the document data indicated by the registration request based on the e-mail address list included in the registration request and the table.

2. The document data sharing system according to claim 1, wherein the registration request further includes the identification information of the e-mail to which the document data to be registered indicated by the registration request was attached, the registration unit is configured to register the document data to be registered, in association with the identification information of the e-mail to which the document data was attached, and when the document data associated with the identification information included in the registration request has already been registered, the registration unit stops processing for the registration request.

3. The document data sharing system according to claim 1, wherein the identification information and the reply identification information are included in a header of e-mail.

4. The document data sharing system according to claim 1, wherein the server apparatus provides the registered document data to the user apparatus together with the version information determined by the registration unit.

5. The document data sharing system according to claim 1, wherein the registration unit determines the version of the document data to be registered indicated by the registration request based on a comparison between the identification information in the list included in the registration request received from the user apparatus and identification information associated with registered document data.

6. A document data sharing system including a user apparatus that transmits and receives e-mail and a server apparatus that registers different versions of document data and provides the document data to the user apparatus, wherein an e-mail received by the user apparatus includes at least identification information for uniquely identifying the e-mail, and further includes, when the e-mail is a reply to other e-mail, reply identification information indicating the identification information of the other e-mail, the user apparatus comprises a transmitting unit that, when registering document data attached to a received e-mail in the server apparatus, examines the reply identification information of the e-mail to which the document data has been attached, thereby generating a list of identification information of one or more past e-mails related to the e-mail and transmitting a registration request including the list and the document data to the server apparatus, and the server apparatus comprises a registration unit that determines a version of the document data to be registered indicated by the registration request based on the identification information in the list included in the registration request received from the user apparatus and registers the document data in a corresponding hierarchical position, wherein the registration unit determines the version of the document data to be registered indicated by the registration request based on the number of pieces of identification information in the list included in the registration request received from the user apparatus.

7. A user apparatus that makes a request to register document data attached to e-mail to a server apparatus that registers different versions of document data, wherein an e-mail received by the user apparatus includes at least identification information for uniquely identifying the e-mail, and further includes, when the e-mail is a reply to other e-mail, reply identification information indicating the identification information of the other e-mail, the user apparatus comprises:

a generating unit that, when registering document data in the server apparatus, examines the reply identification information of an e-mail to which the document data has been attached, thereby generating a list of identification information of one or more past e-mails related to the e-mail; and a transmitting unit that transmits a registration request including the generated list and the document data to the server apparatus, wherein the server apparatus comprises a registration unit that determines a version of the document data to be registered indicated by the registration request based on the identification information in the list included in the registration request received from the user apparatus and registers the document data in a corresponding hierarchical position, wherein the server apparatus further comprises a storage unit that stores a table in which e-mail addresses and log-on accounts for the server apparatus have been associated, wherein the registration request further includes an e-mail address list in which e-mail addresses have been set as destinations of the e-mail to which the document data to be registered indicated by the registration request was attached, and wherein the registration unit sets a log-on account accessible to the document data indicated by the registration request based on the e-mail address list included in the registration request and the table.

8. A user apparatus that makes a request to register document data attached to e-mail to a server apparatus that registers different versions of document data, wherein an e-mail received by the user apparatus includes at least identification information for uniquely identifying the e-mail, and further includes, when the e-mail is a reply to other e-mail, reply identification information indicating the identification information of the other e-mail, the user apparatus comprising:

a generating unit that, when registering document data in the server apparatus, examines the reply identification information of an e-mail to which the document data has been attached, thereby generating a list of identification information of one or more past e-mails related to the e-mail; and a transmitting unit that transmits a registration request including the generated list and the document data to the server apparatus, wherein the server apparatus comprises a registration unit that determines a version of the document data to be registered indicated by the registration request based on the identification information in the list included in the registration request received from the user apparatus and registers the document data in a corresponding hierarchical position, wherein the registration unit determines the version of the document data to be registered indicated by the registration request based on the number of pieces of identification information in the list included in the registration request received from the user apparatus.

9. A method of controlling a user apparatus that makes a request to register document data attached to e-mail to a server apparatus that registers different versions of document data, wherein an e-mail received by the user apparatus includes at least identification information for uniquely identifying the e-mail, and further includes, when the e-mail is a reply to other e-mail, reply identification information indicating the identification information of the other e-mail, the method comprising:

examining, when registering document data in the server apparatus, the reply identification information of an e-mail to which the document data has been attached;

generating a list of identification information of one or more past e-mails related to the e-mail; and transmitting a registration request including the generated list and the document data to the server apparatus, wherein in registering the document data the server apparatus determines a version of the document data to be registered, indicated by the registration request, based on the identification information in the list included in the registration request and registers the document data in a corresponding hierarchical position, wherein the server apparatus stores a table in which e-mail addresses and log-on accounts for the server apparatus have been associated, wherein the registration request further includes an e-mail address list in which e-mail addresses have been set as destinations of the e-mail to which the document data to be registered indicated by the registration request was attached, and wherein in registering the document data, the server apparatus sets a log-on account that is accessible to the document data indicated by the registration request based on the e-mail address list included in the registration request and the table.

10. A method of controlling a user apparatus that makes a request to register document data attached to e-mail to a server apparatus that registers different versions of document data, wherein an e-mail received by the user apparatus includes at least identification information for uniquely identifying the e-mail, and further includes, when the e-mail is a reply to other e-mail, reply identification information indicating the identification information of the other e-mail, the method comprising:

examining, when registering document data in the server apparatus, the reply identification information of an e-mail to which the document data has been attached;

generating a list of identification information of one or more past e-mails related to the e-mail; and transmitting a registration request including the generated list and the document data to the server apparatus, wherein in registering the document data the server apparatus determines a version of the document data to be registered, indicated by the registration request, based on the identification information in the list included in the registration request and registers the document data in a corresponding hierarchical position, wherein in registering the document data the server apparatus determines the version of the document data to be registered indicated by the registration request based on the number of pieces of identification information in the list included in the registration request.

11. A non-transitory computer-readable storage medium storing a computer program, which when executed by a computer, causes the computer to perform a method of controlling a user apparatus that makes a request to register document data attached to e-mail to a server apparatus that registers different versions of document data, wherein an e-mail received by the user apparatus includes at least identification information for uniquely identifying the e-mail, and further includes, when the e-mail is a reply to other e-mail, reply identification information indicating the identification information of the other e-mail, the method comprising:

examining, when registering document data in the server apparatus, the reply identification information of an e-mail to which the document data has been attached;

generating a list of identification information of one or more past e-mails related to the e-mail; and transmitting a registration request including the generated list and the document data to the server apparatus, wherein in registering the document data the server apparatus determines a version of the document data to be registered, indicated by the registration request, based on the identification information in the list included in the registration request and registers the document data in a corresponding hierarchical position, wherein the server apparatus stores a table in which e-mail addresses and log-on accounts for the server apparatus have been associated, wherein the registration request further includes an e-mail address list in which e-mail addresses have been set as destinations of the e-mail to which the document data to be registered indicated by the registration request was attached, and wherein in registering the document data the server apparatus sets a log-on account that is accessible to the document data indicated by the registration request based on the e-mail address list included in the registration request and the table.

12. A non-transitory computer-readable storage medium storing a computer program, which when executed by a computer, causes the computer to perform a method of controlling a user apparatus that makes a request to register document data attached to e-mail to a server apparatus that registers different versions of document data, wherein an e-mail received by the user apparatus includes at least identification information for uniquely identifying the e-mail, and further includes, when the e-mail is a reply to other e-mail, reply identification information indicating the identification information of the other e-mail, the method comprising:

examining, when registering document data in the server apparatus, the reply identification information of an e-mail to which the document data has been attached;

generating a list of identification information of one or more past e-mails related to the e-mail; and transmitting a registration request including the generated list and the document data to the server apparatus, wherein in registering the document data the server apparatus determines a version of the document data to be registered, indicated by the registration request, based on the identification information in the list included in the registration request and registers the document data in a corresponding hierarchical position, wherein in registering the document data the server apparatus determines the version of the document data to be registered indicated by the registration request based on the number of pieces of identification information in the list included in the registration request.

* * * * *